April 23, 1963
A. P. IMPERI
3,086,631
MAGNETIC CLUTCH
Filed May 17, 1961
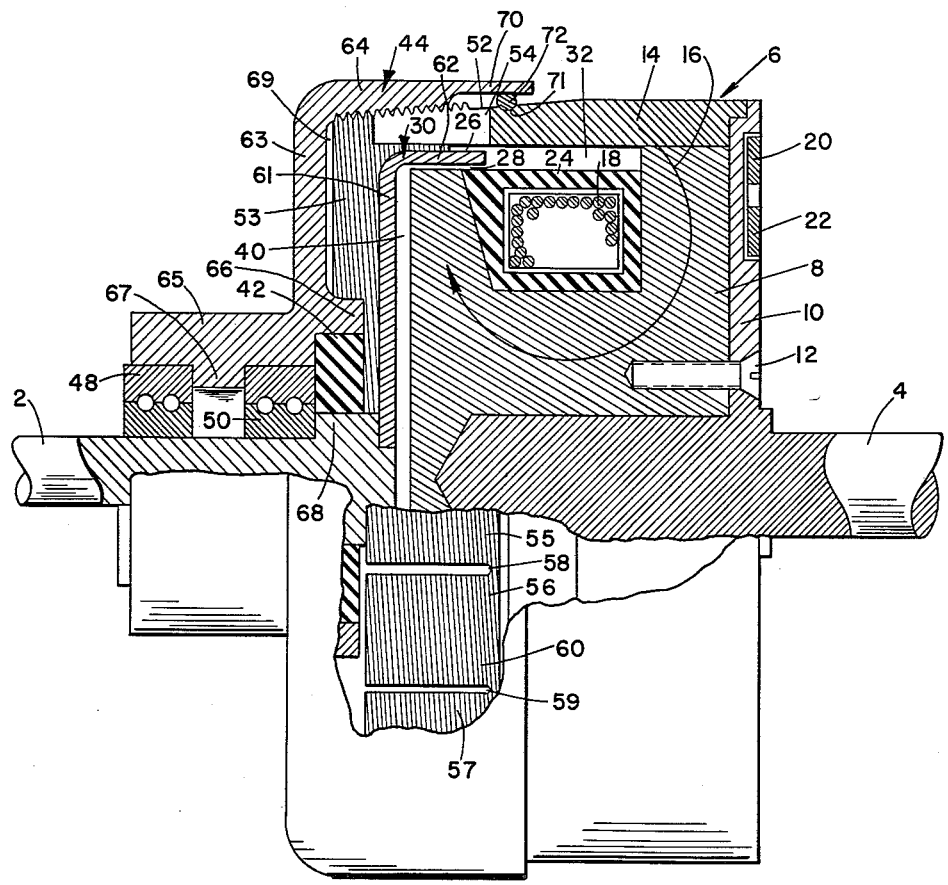
INVENTOR.
ALDO P. IMPERI
BY William N. Patrick

United States Patent Office 3,086,631
Patented Apr. 23, 1963

3,086,631
MAGNETIC CLUTCH
Aldo P. Imperi, Grand Rapids, Mich., assignor, by mesne assignments, to Lear Siegler, Inc., Santa Monica, Calif., a corporation of Delaware
Filed May 17, 1961, Ser. No. 110,757
6 Claims. (Cl. 192—21.5)

This invention relates to a magnetic clutch. More particularly this invention relates to a magnetic particle clutch which is adapted to be adjusted to give a predetermined torque vs. exciting current characteristic. This application is a continuation-in-part of application bearing Serial No. 805,307, filed April 9, 1959, now Patent No. 3,001,619, granted September 26, 1961, by Aldo P. Imperi for Magnetic Clutch.

Magnetic particle clutches of various types have been devised to transmit a torque from one shaft to another. While these clutches may be designed to have various torque vs. exciting current characteristics, the device of this invention contemplates a means for adjustably setting a given clutch to a predetermined torque vs. exciting current characteristic within a given range of characteristics.

In clutches which are presently made, there is a large variations in torque vs. exciting current characteristics due to manufacturing tolerances. There is no practical means to vary the characteristic after the clutch is assembled. Although the characteristic may be varied by changing to a different type or blend of particle powder, the amount of change in characteristic cannot be predicted accurately. The torque vs. exciting current characteristic of a clutch can be reduced by machining the air gap, but predicting the performance of such a clutch accurately is impossible.

The gain or torque vs. exciting current characteristic of the clutch can be varied by varying the quantity of particle powder, which means using an overrated clutch and starving the air gap of powder. When the air gap is starved of particle powder, the clutch performance becomes inconsistent and the clutch becomes sensitive to attitude.

It is frequently desirable to adjust the components of a servo system to have a predetermined transfer characteristic to thereby achieve a predetermined result. Adjustment of the servo system is usually achieved by changing the electrical characteristics of a servo amplifier, or the like. It is, however, frequently desirable to utilize the same design of servo amplifier in system after system and to make adjustments of the servo transfer function by adjusting a mechanical link of the servo system. Adjustment in the mechanical apparatus is particularly desirable if the apparatus happens to be of a reliable type which maintains its calibration. The clutch contemplated by this invention is a torque transmitting device which is adapted to be adjusted to a predetermined torque vs. exciting current characteristic and which is particularly useful as a link in a servo system.

The device of this invention, therefore, contemplates a means for controlling the torque vs. exciting current characteristic by varying the reluctance of the magnetic flux path.

The specific embodiment set forth in this application shows a means which has been found particularly useful in varying the air gap length within the flux path by the use of a particular mechanism, to thereby vary the reluctance of the flux path and the torque vs. exciting current characteristic.

It is, therefore, an object of this invention to provide an improved magnetic clutch.

It is another object of this invention to provide a magnetic clutch which has adjustable torque vs. exciting current characteristic.

It is still another object of this invention to provide a magnetic particle clutch which has an adjustable member adapted to vary the slip-torque vs. exciting current characteristic of the clutch.

Other objects of this invention will become apparent from the following description when taken together with the accompanying drawing showing a side view, partially in section and partially in profile, of an embodiment of this invention.

Referring to the drawing, first shaft 4 and second shaft 2 are substantially co-axial with each other, and are rotatable relative to each other. Ferromagnetic spool 8, flange or hub 10, housing or flux plate 14, and centering member 44 are attached symmetrically to shaft 4 about its axis to form first clutch member 6. Flange 10 extends radially outward from shaft 4. The first end of spool 8 is fixedly attached to flange 10 by a plurality of screws 12. Flux plate 14 is of ferromagnetic material adapted to guide flux lines in the path shown by arrow 16. The annular flux plate 14 is symmetrically disposed about the axis of rotation of shaft 4 and is joined at its first end to the first end of spool 8 and to flange or hub plate 10. The other or second end of flux plate 14 is spaced apart from spool 8 to form an annular slot 32 therebetween which is symmetrically disposed about the axis of shaft 4 in the general shape of a right circular cylinder. Wound around the axis of spool 8 is a coil 18 of electrical conductors which, when supplied by electrical current, generate a magnetic flux in the flux path shown by arrow 16. Coil 18 is electrically connected to slip rings 20 and 22 to receive electrical current transmitted therethrough. Coil 18 is usually surrounded by an insulating and sealing material 24, such as a potting compound, well known in the art.

A second clutch member 30, which is of ferromagnetic material, is attached to rotate with shaft 2. The second clutch member 30 has a first part 61 extending radially outward from the second shaft 2 to the slot 32, and a second part 62 extending axially into the slot. The second part is a continuation of the first part. The second part is so positioned in slot 32 as to form first gap 26 between flux plate 14 and the second part 62, and second gap 28 between the second part 62 and spool 8. Gaps 26 and 28 are filled with a ferromagnetic particle powder which is adapted to form chains of particles to carry torque by friction between first clutch member 6 and second clutch member 30.

The second end of flux plate 14 is composed of a plurality of ferromagnetic cantilevered spring sections, such as 54, 55, 56 and 57, separated by axially directed axial slots 58, 59, for example, beginning at the second end of the flux plate and extending part of the distance between the second end and first end of the flux plate. The outer peripheral surface of the spring sections are tapered and are threaded to form a first screw thread means on the second end of flux plate 14. The taper on the outer surface of the spring sections is such that the distance from the axis of rotation decreases as the distance from the second end of the flux plate decreases. The cantilevered spring sections, such as spring section 54, are flexible and able to move so as to narrow or widen gap 26. They are normally biased to an open, radially outward directed position and are adapted to be forced into a closed radially inward directed, position by centering means 44, described more particularly hereinafter.

Centering member 44 is symmetrically disposed about the second shaft 2. The centering member has a first section 63 extending radially outward from the second shaft and an annular second section 64 extending axially from the outer terminus of the first section to engage the spring sections. The second section is a continuation of the first section and has tapered second screw thread means 53 on the inner peripheral surface thereof. The taper on the inner peripheral surface of the second section 64 complements the taper on the outer peripheral surface of the spring sections. The screw or thread means on the centering member 44 engage the first threaded screw means on the spring sections such as the threads designated at 60 on cantilevered spring section 56. Stating this in another manner, the outer surface of the cantilevered springs are inclined relative to the axes of the shafts. The inner surface of the tapered screw means on centering member 44 is also inclined to engage the threads on the outer surface of the cantilevered springs. This inclination is shown more particularly at 52.

First hub section 65 extends axially outward from the radial section 63 of the centering member. A second hub section 66 extends axially inward from the radial section 63. Centering member 44 is mounted upon bearings 48 and 50 for rotation relative to shaft 2. Circular shoulder 67, extending toward the axis of rotation from the inner surface of hub section 65, serves to separate the two bearings. Axial motion of centering member 44 forces bearing 50 to push axially against shoulder 68 on shaft 2 to thereby axially move second clutch member 30. Clearance for the motion of clutch member 30 is provided by space 40 between clutch member 30 and second end of spool 8. The width of space 69 between radial section 65 and clutch member 30 is invariable. Magnetic particles are maintained within space 40, slot 32 and space 69 by means of seal 42 surrounding shaft 2 and abutting hub section 66.

In operation, when coil 18 is energized, magnetic flux is created which causes shafts 2 and 4 to be clutch-connected through friction of the magnetic particles such as iron powder (not shown).

In the drawing, as centering member 44 is screwed in and out, bearing 50 forces shaft 2 and clutch member 30 to move axially to the right or left, and at the same time causes the cantilevered spring sections to move toward or away from the axis of rotation to thereby vary the width of gap 26. When the width of gap 26 is varied, the torque vs. exciting current characteristic of the clutch is also varied. For example, when centering member 44 is moved to the right so that the interengaged area of the two thread means on the centering member and on flux plate or spring sections increase, cantilevered springs, such as springs 54, 55, 56 and 57 are forced toward the axes of shafts 2 and 4 to narrow gap 26 to thereby vary the torque vs. exciting current characteristic of the clutch. When centering member 44 is screwed to the left, the bias of the cantilevered springs, such as cantilevered springs 54, 55, 56 and 57, causes them to move radially outward away from the axes of the shafts 2 and 4 to open gap 26, to thereby vary the torque vs. exciting current characteristic of the clutch.

When the respective gap width of the clutch of this invention is increased, the torque vs. exciting current characteristic of the clutch is decreased. Conversely, when the gap length of the clutch is decreased, the torque vs. exciting current characteristic of the clutch increases.

As shown in the drawing, the annular section 64 of the centering member 44 ends in a projection 70 which extends beyond the tapered threaded section 53. The projection 70 is spaced apart from the outer peripheral surface of the flux plate 14 and is of a length sufficient to extend beyond the terminus of the axial slots in the flux plate when thread means 53 engages the thread means 60. A circumferential groove 71 is located in the outer surface of the flux plate 14 intermediate the slots separating the cantilevered spring sections and the first end of the flux plate. This groove is adjacent the slots and is positioned so as to be shielded by projection 70 when the threads 53 of centering member 44 engage threads 60 on the cantilevered spring sections. An O-ring seal 72 is seated in groove 71 and contacts the inner surface of projection 70. The O-ring seal serves to retain any magnetic powder particles which may escape from gap 26 or slot 32 through the slots separating the cantilevered spring sections.

The device of this invention, therefore, is a magnetic particle clutch which is designed to be adjusted to generate a specific value of torque for a predetermined value of exciting current. It also provides a magnetic particle clutch which is adapted to be adjusted for compensation of manufacturing tolerances. The clutch of this invention is likewise well adapted to be utilized as a servo element which will consistently maintain a predetermined transfer function over a long period of time.

The bearings or bearing races 48 and 50 are press fitted onto shaft 2 and into hub section 65. Alternatively, a cement or solder can be used to attach the bearings or bearing races to the shaft 2 and/or the inside of the hub 65. Another method of keeping the bearings in place is with a retainer ring or washer fitted into a groove in shaft 2 provided for that purpose adjacent that end of bearing 48 which is further removed from bearing 50. Still other methods of retaining bearings will be evident to one skilled in the art.

Although this invention has been described and illustrated in detail, the same is to be taken by way of illustration and example only and not by way of limitation, the spirit and scope of this invention being limited only by the appended claims.

I claim:

1. An electromagnetic clutch comprising in combination: a first shaft member; a second shaft member, substantially coaxially with and rotatable relative to said first shaft member; a ferromagnetic spool attached to said first shaft member for symmetrical rotation about the axis of said first shaft member, said spool having a first end and a second end, said first shaft extending from said first end of said spool; a coil of electrical conductors, adapted to receive electrical current, wound around said spool; a pair of slip rings connected to said coil to carry electrical current thereto; a flux plate member of ferromagnetic material disposed symmetrically about the axes of said shafts and attached by its first end to said first end of said spool and spaced apart from said spool at its second end to form an annular slot between said flux plate and said spool symmetrically disposed about the axes of rotation of said shafts, said flux plate having flexible ferromagnetic cantilevered spring sections formed by axial slots extending from said second end of said flux plate for a part of the distance from said second to said first ends of said flux plate, said spring sections having first screw thread means on the outer periphery thereof; a second ferromagnetic clutch member attached to said second shaft for rotation therewith; said second clutch member having a first part extending radially outward from said second shaft to said slot and a second part extending axially into said slot, said second part being a continuation of said first part; said second clutch member being positioned so as to provide for a first annular gap between said second part of said second clutch member and the peripheral surface of said spool and a second annular gap between said second portion of said clutch member and the inner surface of said spring sections of said flux plate; a centering member symmetrically disposed about said second shaft, said centering member having a first section extending radially outward from said second shaft and an annular second section extending axially to engage said spring sections, said second section being a continuation of said first section, said annular second section having tapered screw thread means on the inner periphery thereof wherein the distance between the axis of rotation of said shafts and said screw means on said inner periphery of said second section decreases with decreasing distance from said first section, said tapered screw thread means being adapted to engage said first screw thread means on said spring sections, thereby causing said spring sections to spring inwardly with increased interengaged area of said tapered screw thread means and said first screw thread means and thereby narrowing said second annular gap.

2. The electromagnetic clutch of claim 1 wherein said centering member adapted to axially move said second shaft in response to the axial position of said centering member.

3. The electromagnetic clutch of claim 1 wherein said centering member has bearing means symmetrically deposited about the axis thereof, said bearing means being adapted to receive said second shaft member and support said second shaft member in centered relation relative to said slot, said centering member having shoulder means adapted to engage said bearing means and said second shaft to axially move said second shaft in response to the axial position of said centering member.

4. An electromagnetic clutch comprising in combination: a first shaft member; a second shaft member, substantially coaxially with and rotatable relative to said first shaft member; a ferromagnetic spool attached to said first shaft member for symmetrical rotation about the axis of said first shaft member, said spool having a first end and a second end, said first shaft extending from said first end of said spool; a coil of electrical conductors, adapted to receive electrical current, wound around said spool; a pair of slip rings connected to said coil to carry electrical current thereto; a flux plate member of ferromagnetic material disposed symmetrically about the axes of said shafts and attached by its first end to said first end of said spool and spaced apart from said spool at its second end to form an annular slot between said flux plate and said spool symmetrically disposed about the axes of rotation of said shafts, said flux plate having flexible ferromagnetic cantilevered spring sections formed by axial slots extending from said second end of said flux plate for a part of the distance from said second to said first ends of said flux plate, said spring sections having first screw thread means on the outer periphery thereof; a second ferromagnetic clutch member attached to said second shaft for rotation therewith; said second clutch member having a first part extending radially outward from said second shaft to said slot and a second part extending axially into said slot, said second part being a continuation of said first part; said second clutch member being positioned so as to provide for a first annular gap between said second part of said second clutch member and the peripheral surface of said spool and a second annular gap between said second portion of said clutch member and the inner surface of said spring sections of said flux plate; a centering member symmetrically disposed about said second shaft, said centering member having a first section extending radially outward from said second shaft and an annular second section extending axially to engage said spring sections, said second section being a continuation of said first section, said annular second section having tapered screw thread means on the inner periphery thereof wherein the distance between the axis of rotation of said shafts and said screw means on said inner periphery of said second section decreases with decreasing distance from said first section, said tapered screw thread means being adapted to engage said first screw thread means on said spring sections, whereby the progressive engagement between said threaded annular second section and said threaded cantilevered spring sections causes said cantilevered spring sections to spring inwardly and thereby narrow said second annular gap, and wherein said second section of said centering member ends in a projection which extends beyond said tapered screw thread means, said projection being spaced apart from the outer peripheral surface of said flux plate.

5. The electromagnetic clutch of claim 4 wherein said flux plate has a circumferential groove on the outer peripheral surface thereof intermediate said axial slots and said first end of said flux plate, and an O-ring positioned in said groove and in contact with the inner peripheral surface of said extension.

6. The electromagnetic clutch of claim 4 wherein said flux plate has a circumferential groove on the outer peripheral surface thereof intermediate said axial slots and said first end of said flux plate, and an O-ring positioned in said groove and in contact with the inner peripheral surface of said extension and a magnetic particle powder in said gaps.

References Cited in the file of this patent
UNITED STATES PATENTS

| | | |
|---|---|---|
| 1,141,648 | Mitchella | June 1, 1915 |
| 2,921,657 | Winther | Jan. 19, 1960 |